United States Patent Office 2,791,507

Patented May 7, 1957

1

2,791,507

MEAT PRODUCT AND METHOD OF PREPARING SAME

Eugene Fresch, Hannibal, N. Y.

No Drawing. Application April 8, 1953, Serial No. 347,618

2 Claims. (Cl. 99—107)

This invention relates to foodstuffs and particularly to a packed and frozen product of meat ingredients.

The object of the invention is to provide a food of mixed meat particles which will be inexpensive, savory, wholesome and preserved against spoilage.

Another object of the invention is to provide a method of production of the food insuring the optimum blending of the ingredients imparting and maintaining an attractive, appetizing appearance.

A further object of the invention is to utilize in the food various meat by-products by shredding, grinding, mixing and bleading them in a manner giving a likeness to a red meat product such as ground beef.

The composition consists substantially of meat and meat by-products which are both nutritious and healthful.

The bulk of the materials, normally frozen, is shredded in an impact disintegrator and then is ground in a sausage grinder to a fineness readily passing through a ⅛" plate of the grinder, the machinery involved being heavy and handling substantial quantities of the meat. During the shredding, grinding and mixing, the temperature rises to 35° to 40° F. to condition the materials for packaging. The shredding effort applied is kept moderate to avoid any friction or local concentration of energy tending to spot discoloration. The meat will thus flow without jamming or overheating and pass freely through the machining to attain clean cutting of the particle surfaces with consequent regularity in graining and a nice looking surface effect in the finished product.

Before mixing for the actual blending process the proportions of the various ingredients are predetermined and about 2% of ground sterilized bone meal may be added to supply a source of calcium for considerations of health. A very small amount of preservative is also added against fungus, mold and bacteria, a preferred chemical being, for instance, dehydroacetic acid (Dow), in amount approximating 1/20 of 1% of the whole.

A typical mixture will comprise parts about as follows:

10–25 parts by weight of the lips of the cow, ox, or the like, 10–25 parts by weight of the cheek meat trimmings, being the least in demand of the cheek portions, 10–25 parts by weight of scalded tripe, the lining of the cow's stomach.

These are preferred but other meat by-products such as lungs, udders, ears, second stomach, or other parts not too expensive may be used. In general, the meat by-products may be those of any animal available for slaughtering.

These ingredients will total say 75% to 85% by weight and these by-product particles will be mixed and blended with 15% to 25% by weight of melts similarly shredded and ground. These melts are long, flat, slender glands consisting of a red bloody substance which is allowed to thaw to a higher temperature, 45–50° F., for instance, before or during the shredding and grinding so that it will nearly liquefy. Lighter and darker melts may be blended and higher temperatures will in general darken the coloring.

2

In this softened form it will be distributed through the mixture, bringing it in a short time to a thorough blend in which the by-product particles, by merger and coating with the material of the melts, have imparted to them an attractive, beefy, red coloration. This permeation of the mixture and coating of the particles is vital in the completion of the mixture and it is critically important to preserve the resulting composition.

To attain this, a small amount of ascorbic acid is added, for instance, ¾ of a gram to five pounds of the mixture or about 1/30 of 1%. Sodium salicylate at the rate of 1/10 of 1% in the product with a very small amount of ascorbic acid has also proven particularly advantageous. Benzoate of soda may also be used.

As a final ingredient in the composition, it is important to have the particles of the mixture filmed over with a moisture absorbent whch also is effective against oxidation and evaporation. A preferred absorbing agent is a colloid of the Krim-Ko-Gel type formed as an Irish moss extractive. This is varied in amount according to the moisture content of the materials and is effective in reducing drainage from the frozen ground meat on thawing.

The Krim-Ko-Gel is added in amount about 0.05% to 0.3% by weight and distributed through the mixture and covers all particles as a non-rupturing film which serves as protection against oxidation and dehydration, thus preserving the composition against deterioration in long period storage and maintaining the flavor and color.

It has proven advantageous to add this filming colloid in the mixer after the grinding of the ingredients and effectively spread the Krim-Ko-Gel throughout the mixture for thorough coating of the particles.

Of the colloids of the Krim-Ko-Gel type, SeaKem type 4 (in about 0.25% by weight), SeaKem type 9 (in about 0.05% by weight) and SeaKem type 402 (in about 9.1% by weight) have proven particularly advantageous.

On completion of the final blending with the protective coating of the particles, the composition is ready for packaging, freezing and storage and transportation.

The dispersion of the soft material of the melts blends itself throughout the other meat products imparting a uniform coloring and consolidating the mass. The resultant appearance is that of a beef hamburger and is very attractive and appetizing. The melts employed may be those of cattle, swine, sheep and the like and are found to commingle equally effectively with the various by-product meats; they also are thoroughly compatible and cooperative with the surfacing of the particles by the protective colloid film.

All of the ingredients of the composition work together to provide from by-product material a superior food. The nutritional and health factors are preserved and at the same time the appearance is enhanced in the development of the uniform all-beef texture.

I claim:

1. A meat product consisting of a major proportion of shredded meat particles having clean cut surfaces, said meat particles being blended and individually coated with a minor proportion of meat melts similarly shredded and ground to a near liquid form, said meat melt coating imparting a characteristic beefy red coloring to the mixture, an additional edible preservative material diffused in said product and filming said particles protectively to avoid oxidation and discoloration thereof, and a moisture absorbent distributed through the mixture and covering the particles as a non-rupturing film serving as protection against oxidation and dehydration and preserving the composition against deterioration in flavor and color in long period storage.

2. A method of preparing a meat product comprising shredding and grinding a major proportion of meat to form particles thereof and mixing them as shredded clean cut particles having regular graining, mixing and blending said particles with 15–25% by weight of melts shredded and ground so as to nearly liquefy and to be distributed through the shredded meat mass by merger and coating of the individual meat particles to impart to them a beefy red coloration, applying to the meat mass a fraction of 1% of an edible preservative, and additionally filming the particles of the mixture with an edible moisture absorbent in amount according to the moisture content of the materials thus accumulating film coatings on said individual particles which serve as protection against oxidation and dehydration and preserve the composition against deterioration in flavor and color in long period storage.

References Cited in the file of this patent

UNITED STATES PATENTS

| | | |
|---|---|---|
| 2,203,318 | Yerk | June 4, 1940 |
| 2,417,806 | Bauer et al. | Mar. 25, 1947 |
| 2,440,168 | Cross | Apr. 20, 1948 |
| 2,447,427 | Oftedahl | Aug. 17, 1948 |
| 2,470,281 | Allingham | May 17, 1949 |
| 2,567,085 | Stoloff | Sept. 4, 1951 |
| 2,622,027 | Torr | Dec. 16, 1952 |
| 2,622,028 | Torr | Dec. 16, 1952 |
| 2,622,029 | Torr | Dec. 16, 1952 |

UNITED STATES PATENT OFFICE

CERTIFICATE OF CORRECTION

Patent No. 2,791,507 May 7, 1957

Eugene Fresch

It is hereby certified that error appears in the printed specification of the above numbered patent requiring correction and that the said Letters Patent should read as corrected below.

Column 1, line 50, for "1/29 of 1%" read -- 1/20 of 1% --; column 2, line 17, for "whch" read -- which --; line 19, after "moss" insert -- or chondrus --.

Signed and sealed this 6th day of August 1957.

(SEAL)

Attest:

KARL H. AXLINE

Attesting Officer

ROBERT C. WATSON

Commissioner of Patents